US008422783B2

(12) United States Patent
Yuan et al.

(10) Patent No.: US 8,422,783 B2
(45) Date of Patent: Apr. 16, 2013

(54) METHODS AND SYSTEMS FOR REGION-BASED UP-SCALING

(75) Inventors: Chang Yuan, Vancouver, WA (US); Scott J. Daly, Kalama, WA (US); Dean Messing, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1328 days.

(21) Appl. No.: 12/146,248

(22) Filed: Jun. 25, 2008

(65) Prior Publication Data
US 2009/0324079 A1 Dec. 31, 2009

(51) Int. Cl.
*G06K 9/34* (2006.01)
*G06K 9/32* (2006.01)

(52) U.S. Cl.
USPC ............................... 382/173; 382/298

(58) Field of Classification Search .................. 382/173, 382/199, 298–300, 162, 274; 358/1.9, 1.2, 358/2.1, 443, 449; 348/581, 561; 345/600, 345/611, 619, 428, 606
See application file for complete search history.

(56) References Cited

U.S. PATENT DOCUMENTS

| | | | |
|---|---|---|---|
| 6,674,906 B1 * | 1/2004 | Han et al. ....................... | 382/199 |
| 6,891,968 B2 | 5/2005 | Janardhanan | |
| 6,909,525 B1 * | 6/2005 | Sato ............................... | 358/449 |
| 7,174,049 B2 | 2/2007 | Bhattacharjya | |
| 7,184,058 B2 | 2/2007 | MacInnis et al. | |
| 7,199,837 B2 * | 4/2007 | Callway et al. ................. | 348/581 |
| 7,408,559 B2 * | 8/2008 | Keshet ........................... | 345/611 |
| 2005/0094899 A1 | 5/2005 | Kim et al. | |
| 2007/0153022 A1 | 7/2007 | Keshet | |

OTHER PUBLICATIONS

Heath et al., "A Robust Visual Method for Assessing the Relative Performance of Edge-Detection Algorithms," IEEE Transactions on Pattern Analysis and Machine Intelligence, Dec. 1997, pp. 1338-1359, vol. 19, No. 12, IEEE, USA.
Chen et al, "Text detection and recognition in images and video frames," Pattern Recognition, 2004, pp. 595-608, vol. 37, No. 3, Elsevier Ltd.
Chen et al., "Detecting and Reading Text in Natural Scenes," Proceedings of the 2004 IEEE Computer Society Conference on Computer Vision and Pattern Recognition (CVPR'04), 2004, pp. 366-373, IEEE.
Jung et al., "Text Information Extraction in Images and Video: A Survey," Pattern Recognition, 2004, pp. 977-997, vol. 37, No. 5, Elsevier Ltd.
Li et al., "New Edge-Directed Interpolation," IEEE Transactions on Image Processing, Oct. 2001, pp. 1521-1527, vol. 10, No. 10, IEEE, USA.
Schwenk et al., "Boosting Neural Networks," Neural Computation, Aug. 2000, pp. 1869-1887, vol. 12, No. 8.
Thevenaz et al., "Image Interpolation and Resampling," Handbook of Medical Imaging, Processing and Analysis, 2000, pp. 393-420, I. N. Bankman, Ed., Academic Press, San Diego, CA, USA.
Tomasi et al., "Bilateral Filtering for Gray and Color Images," Proceedings of the 1998 IEEE International Conference on Computer Vision (ICCV), 1998, pp. 839-846, IEEE.

(Continued)

*Primary Examiner* — Ishrat I Sherali
(74) *Attorney, Agent, or Firm* — Kristine Elizabeth Matthews; David C. Ripma

(57) ABSTRACT

Aspects of the present invention are related to systems and methods for region-based up-scaling, and in particular, for up-scaling still images and video frames that contain graphical elements.

25 Claims, 9 Drawing Sheets

OTHER PUBLICATIONS

Viola et al., "Robust Real-Time Face Detection," International Journal of Computer Vision, 2004, pp. 137-154, Kluwer Academic Publishers, The Netherlands.

Welch et al., "An Introduction to the Kalman Filter," UNC-Chapel Hill, Department of Computer Science, TR 95-041, Apr. 5, 2004, pp. 1-16, USA.

Gonzalez et al., "Digital Imaging Processing, 2nd Edition," 2002, pp. 126-137 and pp. 550-552, Prentice Hall, USA.

Cook et al., "Multiresolution Sequential Edge Linking," Proceedings of the IEEE International Conference on Image Processing, Oct. 23-26, 1995, pp. 41-44, IEEE, Washington, D.C., USA.

\* cited by examiner

METHODS AND SYSTEMS FOR REGION-BASED UP-SCALING

FIELD OF THE INVENTION

Embodiments of the present invention comprise methods and systems for region-based up-scaling, and in particular, for up-scaling still images and video frames that contain graphical elements.

BACKGROUND

An image up-scaling, also considered an up-sampling or up-conversion, process may increase the number of pixels in a dimension of an image. Typical up-scaling processes may not provide visually satisfactory results when applied to an image containing graphical elements, also considered graphics, graphics elements, graphical regions, graphical areas, graphics areas and graphics regions. It may be desirable for an up-scaling process to produce an up-scaled image of equal, or increased, visual quality as the original image, even when the content of the image comprises graphical elements. Exemplary graphical elements may comprise text, signs, icons, visual elements generated by two-dimensional (2D) computer graphics systems, visual elements generated by three-dimensional (3D) computer graphics systems and other elements ideally comprising a step edge.

The graphical elements in an image may convey important semantic information about the image and may be more likely to draw a viewer's attention than the other portions of the image, considered non-graphical areas, non-graphics areas, non-graphical regions, non-graphics regions and other terms indicating that an image portion does not comprise graphical elements. Consequently, a viewer may be more likely to notice the clarity and sharpness, or lack thereof, of an up-scaled graphical region, which may influence their perception of the entire image. On the other hand, viewers may pay less attention to non-graphical image regions, which may be less salient. Non-graphical image regions typically do not contain step edges. Scene background regions may be considered non-graphical image regions. Non-graphical image regions may be captured optically or generated by computer graphics methods, and non-graphical image regions may comprise natural scenes, rendered scenes, objects and other scenes in which the edges are not sharp, step edges.

Conventional image up-scaling methods often introduce visible artifacts in a graphics region, which may reduce the perceived visual quality of the up-scaled image. Region-based up-scaling processes may be desirable for these reasons.

SUMMARY

Some embodiments of the present invention comprise methods and systems for up-scaling still images and video frames. In some embodiments of the present invention, graphical regions may be segmented from non-graphical regions, and a first up-scaling method may be applied to the non-graphical regions, and a second up-scaling method may be applied to the graphical regions. Some embodiments of the present invention comprise up-scaling methods and systems in which an edge width may be reduced while an adjacent, substantially uniform area may be expanded into the area from which the edge width was reduced.

Some embodiments of the present invention comprise methods and systems for up-scaling video frames. Some of these embodiments comprise projecting graphical regions from a first frame in a video sequence to a second frame using motion-vector information and comparing the projected graphical region with the corresponding region in the second frame. If the projected graphical region and the corresponding region meet a similarity criterion, then up-scaled version of the graphical region from the frame may be used as the up-scaled version of the corresponding region in the second frame. If the projected graphical region and the corresponding region in the second frame do not meet the similarity criterion, then the second frame may be up-scaled according to embodiments of the present invention.

Some embodiments of the present invention comprise methods and systems for up-scaling graphical elements. In these embodiments, a graphical element edge region may be narrowed while an adjacent, substantially uniform region may be expanded.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 12:
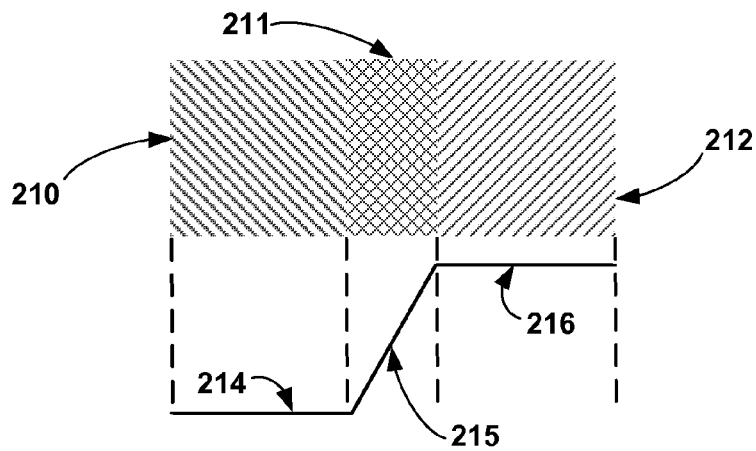
Figure 13:
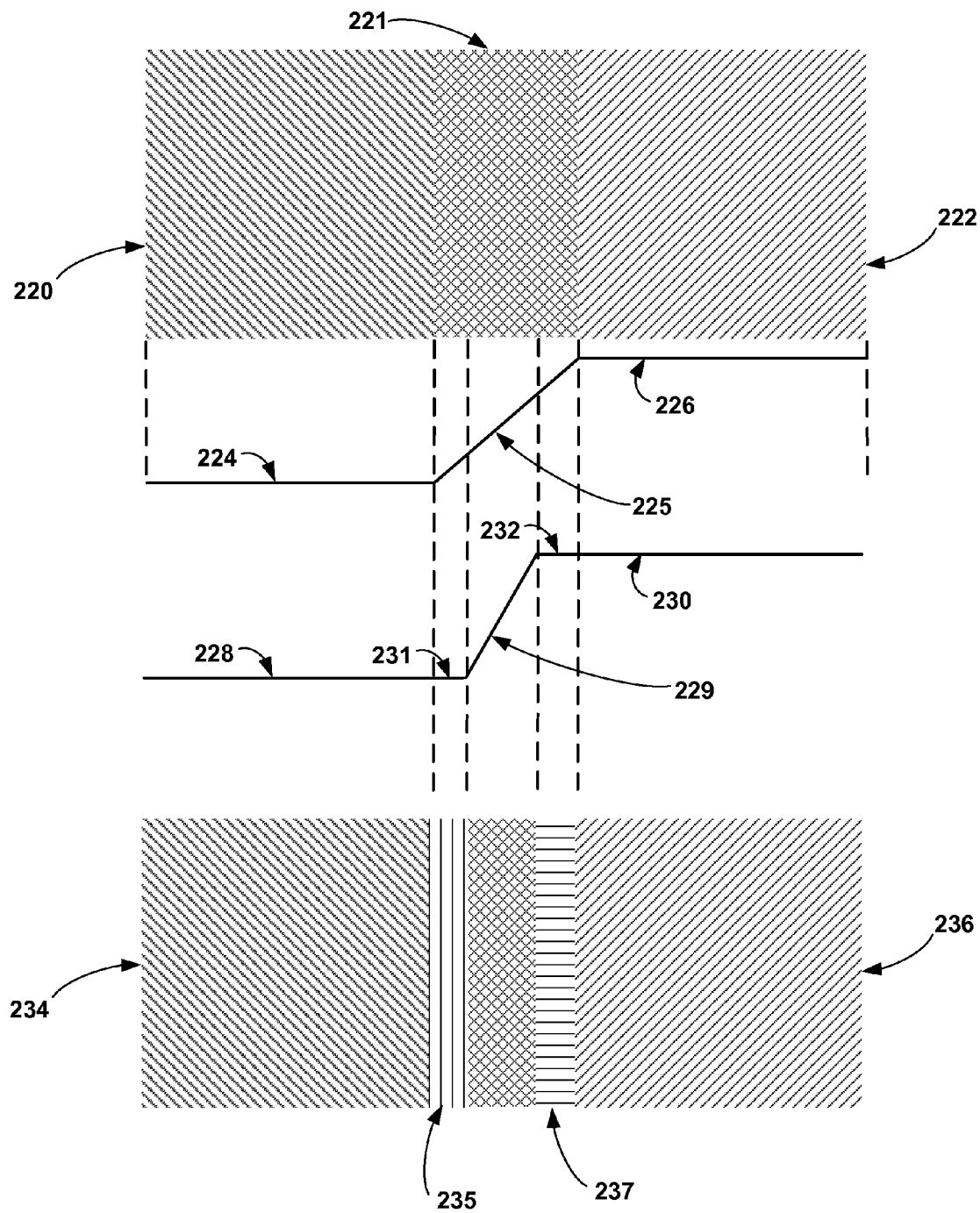

FIG. 12 is a picture depicting an exemplary portion of a graphical element comprising two substantially uniform regions and an edge transition area; and FIG. 13 is a picture illustrating embodiments of the present invention in which an edge area may be shrunk and the adjacent, substantially uniform regions are expanded in up-scaling methods and systems according to embodiments of the present invention.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

An image up-scaling, also considered an up-sampling or up-conversion, process may increase the number of pixels in a dimension of an image. Typical up-scaling processes may not provide visually satisfactory results when applied to an image containing graphical elements. It may be desirable for an up-scaling process to produce an up-scaled image of equal, or increased, visual quality as the original image, even when the content of the image comprises graphical elements. Exemplary graphical elements, also considered graphics, graphics elements, graphical regions, graphical areas, graphics areas and graphics regions, may comprise text, signs, icons, visual elements generated by two-dimensional (2D) computer graphics systems, visual elements generated by three-dimensional (3D) computer graphics systems and other elements ideally comprising a step edge.

Some graphical elements may be overlaid graphics that are electronically mixed or overlaid onto an original, background image. Overlaid graphical elements may not have gone through an optical capture process, and therefore may comprise noise due to system optics and the capture process. Exemplary overlaid graphical elements may comprise movie or television credits, movie or television captions, scoreboards in sports broadcasts and other overlaid graphics. Overlaid graphics may be characterized by regions of substantially uniform color, strong contrast boundaries comprising knife-edge or step-edge transitions in the horizontal, vertical or diagonal directions.

Figure 1A:
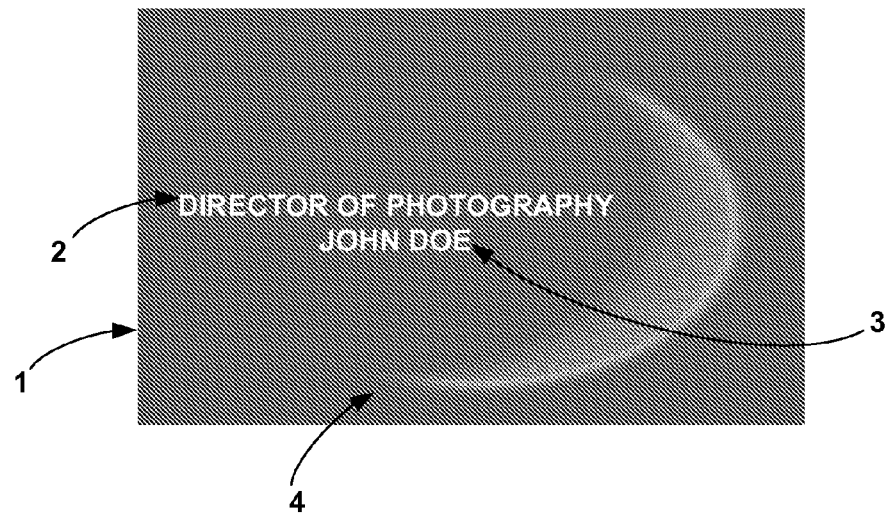
FIG. 1A is a picture depicting an exemplary image comprising exemplary overlaid graphical elements.
Figure 1B:
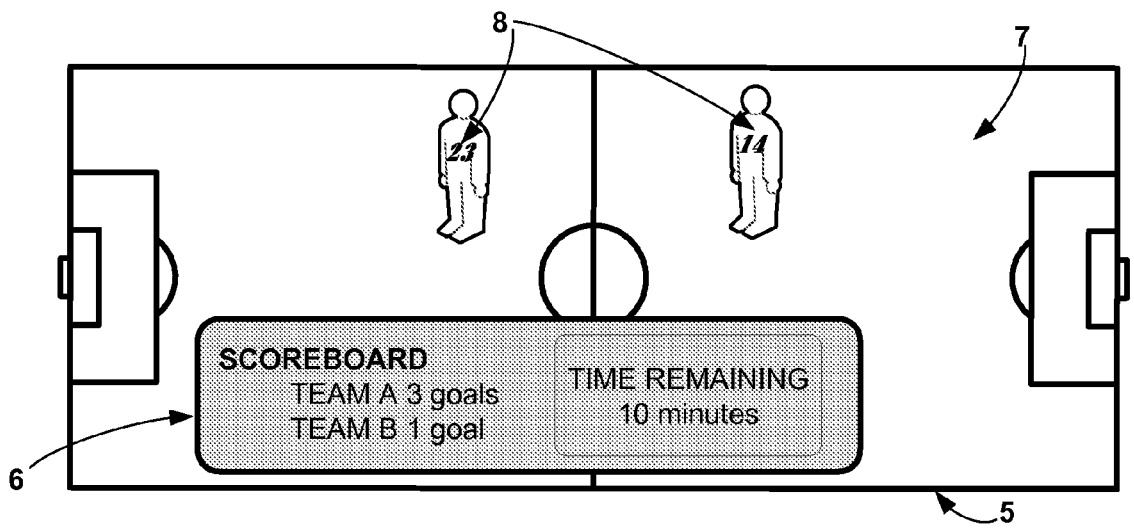
FIG. 1B is a picture depicting an exemplary image comprising an exemplary overlaid graphical element.

FIG. 1A depicts an exemplary image 1 which comprises overlaid graphical elements (for example, the text character "D" 2 and the text character "E" 3) which have been electronically mixed onto an original, background image 4 comprising a nature scene. FIG. 1B depicts an exemplary image 5 which comprises an overlaid graphical element 6 of a scoreboard which has been electronically mixed onto a natural-scene, background image 7. The numbers on the players' jerseys 8 in FIG. 1B depict non-overlaid graphical elements which would be optically captured as part of the background scene 7 on which the overlaid graphical element 6 was electronically mixed.

Figure 2:
FIG. 2 is a picture depicting an exemplary image comprising a graphical element that is part of the optically captured scene.

Other graphical elements may be scene graphics that exist in a natural scene, and these graphical elements may be captured through the optical capture process. Exemplary scene graphics may comprise traffic signs, other signs, neon lights, store banners and other graphics appearing in natural scenes. The scene graphics may appear at arbitrary positions with arbitrary orientations in the image, and scene graphics may be more likely to contain noise and optical artifacts. FIG. 2 depicts an exemplary image 8 which comprises a scene graphical element 10 which has been captured as part of the image 8.

Some embodiments of the present invention comprise methods and systems for up-scaling a still image. Some embodiments of the present invention comprise methods and systems for up-scaling video frames. In particular, some embodiments of the present invention comprise methods and systems for up-scaling still images and video frames that contain graphical elements, specifically, overlaid graphics.

The graphical elements in an image may convey important semantic information about the image and may be more likely to draw a viewer's attention than other non-graphical, portions of the image. Consequently, a viewer may be more likely to notice the clarity and sharpness, or lack thereof, of an up-scaled graphical region, which may influence their perception of the whole image. On the other hand, viewers may pay less attention to the non-graphical image regions, which may be less salient. Non-graphical image regions, also considered scene background regions, typically do not contain step edges. Non-graphical image regions may be captured optically or generated by computer graphics methods, and non-graphical image regions may comprise natural scenes, rendered scenes, objects and other scenes in which the edges are not sharp, step edges.

Conventional image up-scaling methods often introduce visible artifacts in a graphics region, which may reduce the perceived visual quality of the up-scaled image. Region-based up-scaling processes may be desirable for these reasons.

Figure 3A:
FIG. 3A is a picture depicting an exemplary image comprising exemplary overlaid graphical elements.
Figure 3B:
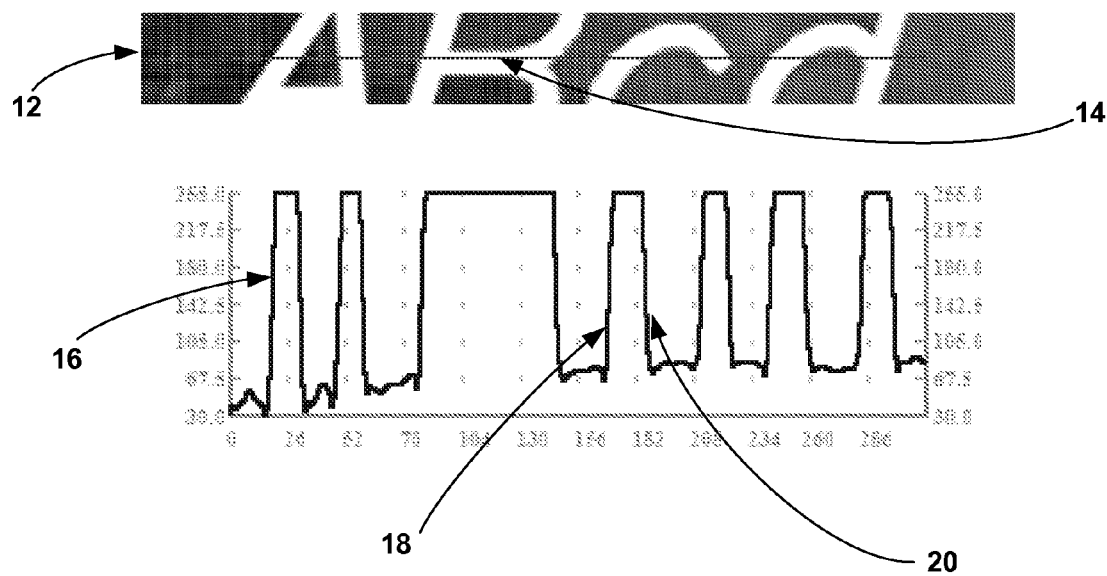
FIG. 3B is a picture showing a portion of a jointly-up-scaled version of the exemplary image from FIG. 3A.
Figure 3C:
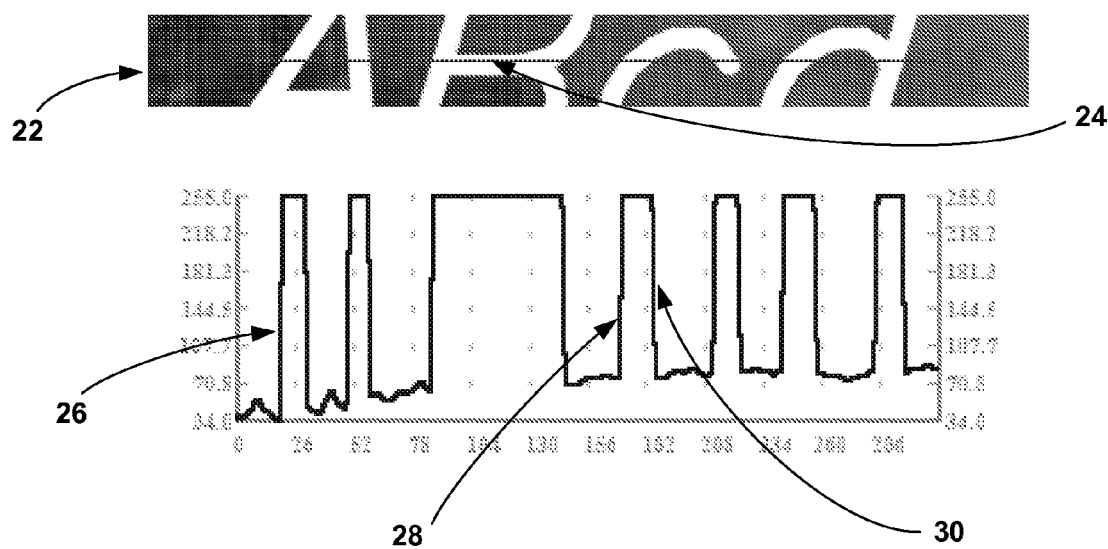
FIG. 3C is a picture showing a portion of a separately-up-scaled version of the exemplary image from FIG. 3A.

FIG. 3 illustrates some issues related to up-scaling a graphical region in an image. FIG. 3A depicts an exemplary overlaid graphical region 11 of a low-resolution image in which the text "ABcd" of font size f has been overlaid on a scene background image. In this example, the graphical region 11 comprises four graphical elements, the text letters "A," "B," "c" and "d." Two high-resolution images have been formed by up-scaling the low-resolution image comprising the exemplary overlaid graphical region 11 according to two different up-scaling paradigms. In particular, two high-resolution images were generated by different up-scaling methods based on the same low-resolution image and the same text string. The exemplary up-scaled image portion 12 shown in FIG. 3B was generated by up-scaling the rendered low-resolution image without special regard to the overlaid graphical region 11. Thus the region 12 may be considered part of a jointly-up-scaled image. The exemplary up-scaled image portion 22 shown in FIG. 3B was generated by up-scaling the low-resolution non-graphical, background portions of the image and then inserting the text rendered with a font size of 2f. Thus the region 22 may be considered part of a separately-up-scaled image. Bi-cubic interpolation was used to up-scale both the joint image in FIG. 3B and the background image in FIG. 3C.

A sampling profile 16, 26 along a horizontal line 14, 24 across the up-scaled image portions 12, 22 is depicted in the respective figures.

The two up-scaled graphics regions 12, 22 in FIG. 3B and FIG. 3C, look substantially the same except for the text contours (for example, the edges of the letter "c" 18, 20 and 28, 30, respectively). This may be because it is easier to see edge blurring in sharp images as opposed to blurry images. It may be observed from the jointly-up-scaled image region 12 in FIG. 3B that the text contours 16 are blurry in contrast to those 26 from the separately-up-scaled image region 22 in FIG. 3C. The cross section 16 shows that the edges along the horizontal direction are smoother and wider (for example the edges of the letter "c" 18, 20). In contrast, the separately-up-scaled image region 22 in FIG. 3C shows very sharp edges (for example the edges of the letter "c" 28, 30) and may be considered more visually appealing. The corresponding edges in FIG. 3C are steeper and narrower than the ones in FIG. 3B. Despite the fact that the variation of edge width may be very small, in some cases at most three pixels, the visual appearance of a jointly-up-scaled image and that of a separately-up-scaled image may be quite different.

Figure 4:
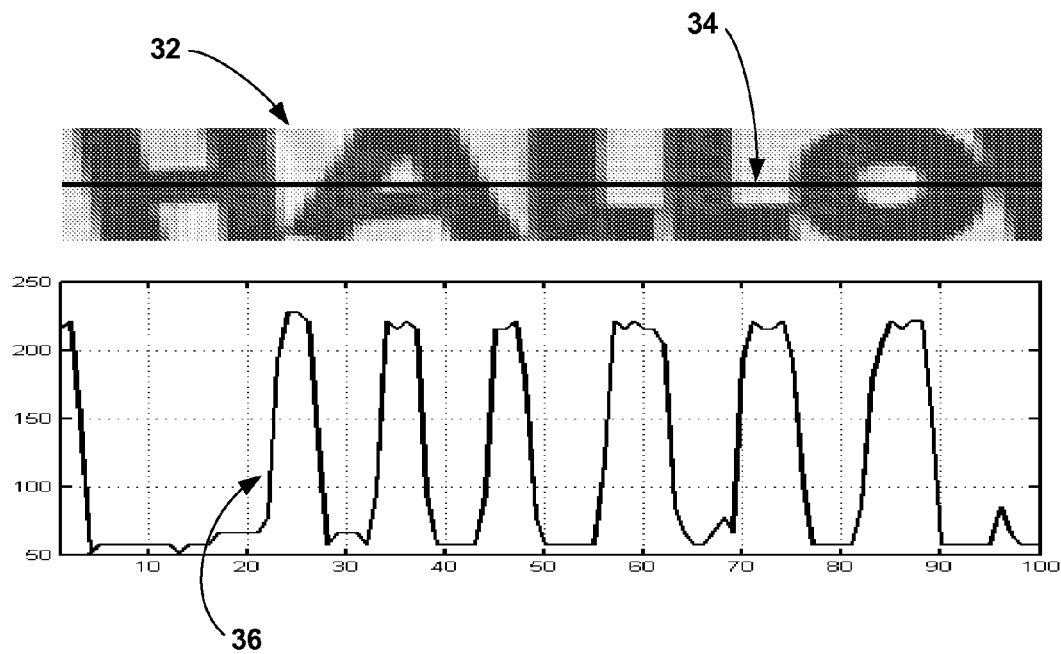
FIG. 4 is a picture showing an up-scaled version of an exemplary image comprising optically captured graphical elements.

FIG. 4 depicts a one-dimensional (1D) cross section 36 sampled across 34 an exemplary scene graphical region 32. Similar to the case of jointly-up-scaled graphics in FIG. 3B, the edges along text contours are smoother and wider, which may result in a blurry appearance. Additionally, the colors of the graphics regions, mainly white, are less uniform than those in FIG. 3B and FIG. 3C.

Some embodiments of the present invention comprise methods and systems for segmenting a graphical element from an image and applying a separate up-scaling method to the graphical element. In some embodiments of the present invention, the substantially uniform colors and sharp edges within a graphics region may be preserved throughout the up-scaling process.

Figure 5:
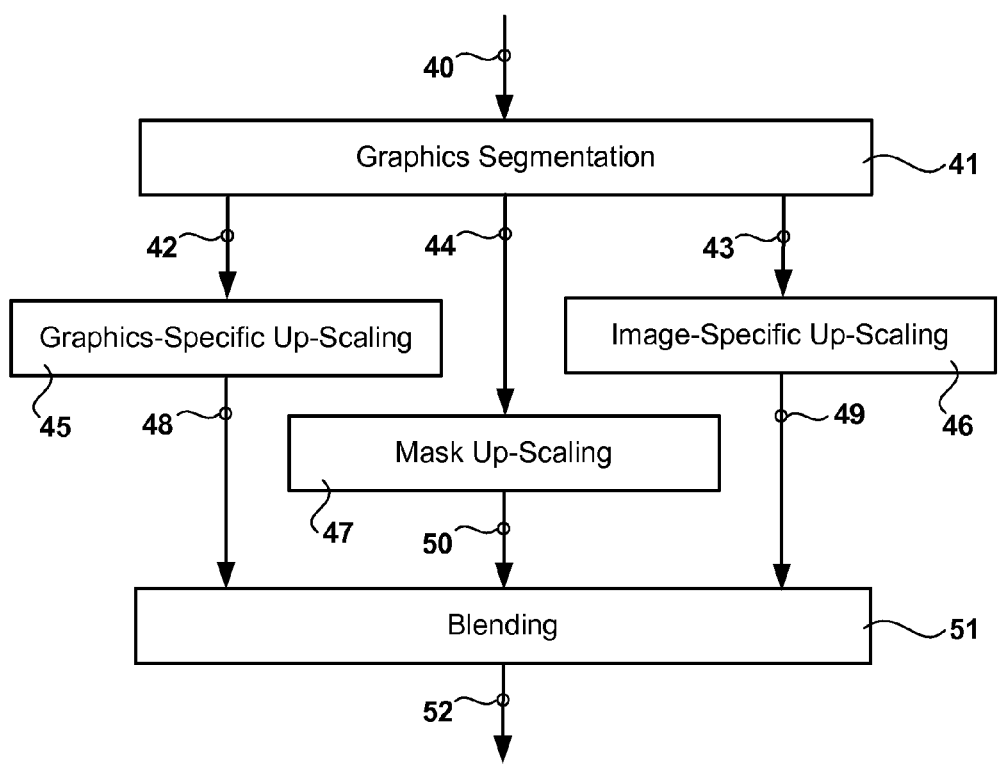
FIG. 5 is a chart showing exemplary embodiments of the present invention comprising segmentation and separate up-scaling of graphical regions and non-graphical regions.

Some embodiments of the present invention may be described in relation to FIG. 5. In these embodiments, an original image 40 may be segmented 41 into graphical elements 42 comprising step edges between substantially uniformly colored regions and a non-graphics area 43, which may comprise the remainder of the image 40. The segmentation 41 may also produce a segmentation mask 44. The graphical elements 42 may be referred to as the graphics channel and the non-graphics area 43 may be referred to as the non-graphics channel. The original image 40 may be decomposed according to:

$$I_{orig}(x,y) \rightarrow \alpha(x,y) I_{graphics}(x,y) + [1-\alpha(x,y)] I_{non\text{-}graphics}(x,y),$$

where $I_{orig}(x, y)$, $I_{graphics}(x, y)$ and $I_{non\text{-}graphics}(x, y)$ refer to the pixel values at location (x, y) in the original image 40, an image with the graphical elements 42 and an image without the graphical elements 43, respectively, and where $\alpha(x, y)$ refers to the values at location (x, y) in the binary or grayscale segmentation-mask image 44, which may be considered the alpha map or alpha channel. The alpha-map values may modulate the contribution from the graphics and non-graphics channels. In some embodiments of the present invention, the value of $\alpha(x, y)$ may be between 0 and 1. In alternative embodiments, the value of $\alpha(x, y)$ may be 0 or 1. In some of these embodiments, a value of 1 may indicate that a pixel at location (x, y) belongs to a graphics region 42, and a value of 0 may indicate that a pixel at location (x, y) belongs to the non-graphics region 43. In alternative of these embodiments, a value of 1 may indicate that a pixel at location (x, y) belongs to the non-graphics region 43, and a value of 0 may indicate that a pixel at location (x, y) belongs to a graphics region 42.

After graphics segmentation 41, each channel 42, 43, 44 may be up-scaled independently 45, 46, 47, and the resulting up-scaled images 48, 49, 50 may be blended 51 to form the final, up-scaled image 52.

In some embodiments of the present invention, the up-scaled channels may be blended 51, according to:

$$\alpha^h I_{graphics}^h + (1-\alpha^h) I_{non\text{-}graphics}^h \rightarrow I_{result}^h$$

where $I_{graphics}^h$ 48 is the up-scaled version of the low-resolution image $I_{graphics}$ 42, $I_{non\text{-}graphics}^h$ 49 is the up-scaled version of the low-resolution image $I_{non\text{-}graphics}$ 43, and $\alpha^h$ 50 is the up-scaled version of the low-resolution segmentation map a 44.

In some embodiments of the present invention, the non-graphics channel 43 may be up-scaled according to any of the known-in-the-art up-scaling methods. Exemplary methods may comprise the methods described, for example, in Gonzalez and Woods, *Digital Image Processing,* 2 edition, Prentice Hall, 2002, in Li and Orchard, "New edge directed interpolation," *IEEE Transactions on Image Processing*, volume 10, no. 10, pp. 1521-1527, 2001, in Thévenaz, Blu and Unser, "Image interpolation and resampling," in *Handbook of Medical Imaging*, I. N. Bankman, editor, Academic Press, Orlando, Fla., 393-420.

In some embodiments of the present invention, the mask image 44 may be up-scaled by pixel replication. In alternative embodiments of the present invention, the mask image 44 may be up-scaled by interpolation.

Figure 6:
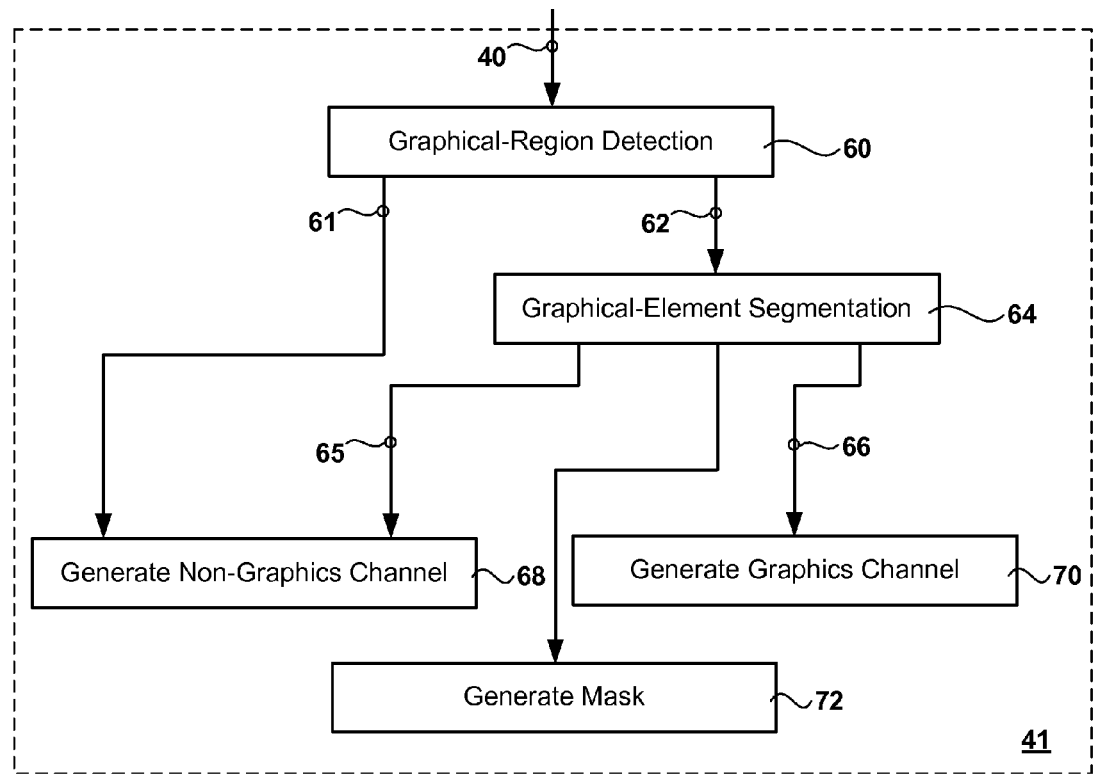
FIG. 6 is a chart showing exemplary embodiments of the present invention comprising segmentation of graphical elements from non-graphical regions.

In some embodiments of the present invention, graphics segmentation 41 may be described in relation to FIG. 6. In these embodiments of the present invention, candidate graphical regions 62 may be detected 60 from the original image 40. Regions 61 in which there are no graphical elements detected may be used to generate 68 the non-graphics channel. Candidate graphical regions 62 may be segmented 64 into graphical elements 66 and non-graphical, background portions 65. The non-graphical portions 65 may be combined with the regions 61 in which there are no graphical elements to form 68 the non-graphics channel. The segmented graphical elements 66 may be used to generate 70 the graphics channel, and the mask image may be generated 72 through the graphical-element segmentation 64.

In some embodiments of the present invention, the candidate image patches 62 containing graphical elements may be detected 60 from the original image 40 by a statistical pattern classification method. In some embodiments of the present invention, a color-based segmentation method may be used to segment 64 graphical elements 66 from the non-graphics area 65 and to obtain accurate boundaries of the graphics elements.

Figure 7:
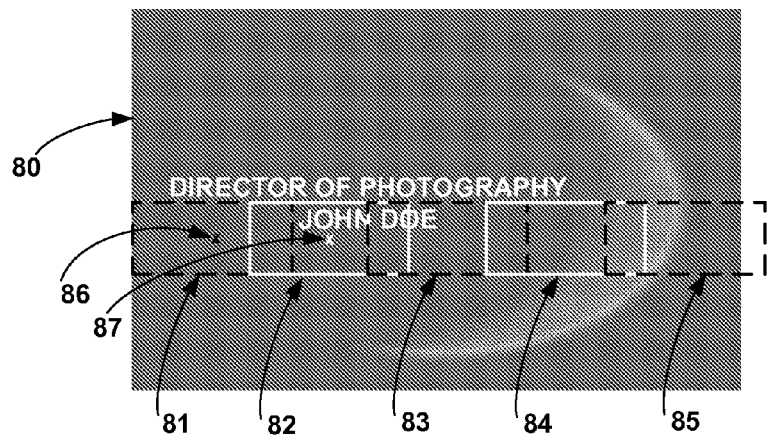
FIG. 7 is a picture illustrating embodiments of the present invention comprising overlapping patches for segmentation.

Some embodiments of the present invention may comprise graphical-region detection 60 which may be illustrated in relation to FIG. 7. In these embodiments, an input image 80 may be divided into overlapping image patches (exemplary patches shown in FIG. 7 in alternating dashed-black and solid-white outlines 81, 82, 83, 84, 85), also considered image regions. Each patch (exemplary patches shown 81, 82, 83, 84, 85) may be an image region sampled around a center pixel (two exemplary patch centers shown in FIG. 7 86, 87). In some embodiments of the present invention, an image patch may be an 80-pixel by 30-pixel rectangle. In other embodiments of the present invention, the patch shape may not be rectangular. In some embodiments of the present invention, the image patches may overlap in only one direction. In alternative embodiments, the image patches may overlap in two directions. In some embodiments, the center pixel may be stepped sequentially through the image with a pre-defined displacement step. In some embodiments, the displacement step may be in one direction. In alternative embodiments, the displacement step may be in two directions. In some embodiments of the present invention, the pre-defined displacement step may be 10 pixels in the horizontal direction. In alternative embodiments of the present invention, the pre-defined displacement step may be 10 pixels in each the horizontal and vertical directions. In some embodiments of the present invention, the size of the overlapping area between two adjacent patches may be 20% of the area of a patch. In some embodiments of the present invention, when there is not sufficient image data to fill a patch, for example, when the patch 85 is on the image boundary, the boundary data may be replicated to fill the patch. In alternative embodiments, the patch may be smaller than the nominal patch size. The size of the image patches and the displacement step may be selected such that each patch may contain sufficient, unique information for detection and also such that each patch may be processed quickly.

In some embodiments of the present invention, image patches may be classified into one of two classes: a class indicating that a patch contains graphical elements, and a class indicating that a patch does not contain graphical elements. For the exemplary image 80 and exemplary patches 81, 82, 83, 84, 85 shown in FIG. 7, two patches 82, 83 contain graphical elements, and three patches 81, 84, 85 do not. In some embodiments, the classification result may be quantified by a score, $h(x, y) \in [-1, 1]$, that indicates how likely the image patch is to contain graphics, wherein one extreme, for example, $-1$, means absolutely not likely, or certainly not, and the other extreme, for example, 1, means absolutely likely, or certainly so.

Figure 8:
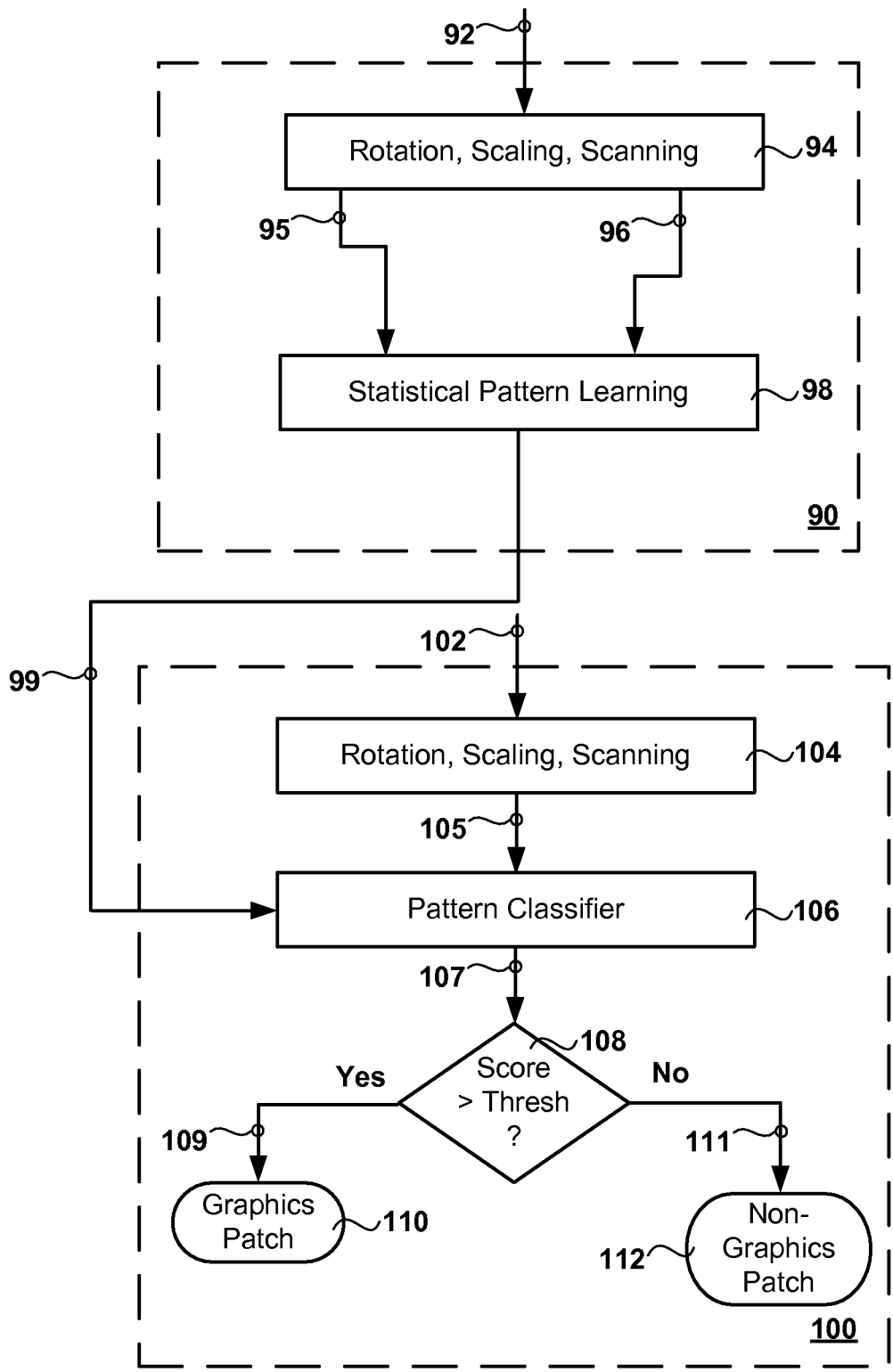
FIG. 8 is a chart showing exemplary embodiments of the present invention comprising classifier training and unknown-class classification.

In some embodiments of the present invention described in relation to FIG. 8, image patch classification may comprise pattern learning 90 and classification 100. The first stage, called the training stage 90, may require a set of training images 92, in which each patch is labeled as either a positive sample patch 95 (for example, containing a graphical element) or a negative sample patch 96 (for example, not containing a graphical element). In some embodiments of the present invention, in order to robustly detect the graphics regions with different scales and orientations, the training images 92 may be stretched to difference scales and rotated with different orientation angles 94, in addition to the original images. Statistical pattern learning methods 98 may be used to train a classifier to respond to the common image patterns shared among the positive patches 95 and to reject the image patterns in the negative patches 96. The result of the statistical pattern learning 98 may comprise parameters and other pattern classifier information 99.

Exemplary method for pattern learning and classification may include the text detection method of Chen et al. disclosed in D. Chen, J.-M. Odobez and H. Bourlard, "Text detection and recognition in images and video frames," *Pattern Recognition*, vol. 37, no. 3, pp. 595-608, 2004, the text detection method of Chen and Yuille disclosed in X. Chen and A. L. Yuille, "Detecting and reading text in natural scenes," *IEEE Conference on Computer Vision and Pattern Recognition*, vol. 2, pp. 366-373, 2004, a neural network method disclosed by Schwenk and Bengio in H. Schwenk and Y. Bengio, "Boosting Neural Networks," *Neural Computation*, vol. 12, pp. 1869-1887, 2000, the detection method taught by Viola and Jones in P. Viola and M. Jones, "Robust real-time face detection," *International Journal of Computer Vision*, vol. 57, no. 2, pp. 137-154, 2004 and other supervised-learning methods known in the art.

In some embodiments of the present invention, classification 100, also considered prediction, of unknown-class input data 102 may use the trained classifier information 99 to predict if a given patch 102 contains graphics or not. In these embodiments, the input image patches 102 may be scaled and rotated 104. A patch 102 may be classified 106 using a classifier based on the training 90. A score 107 generated by the classification 106 may be compared 108 to a threshold. If the score 107 is greater 109 than the threshold, then the patch may be considered a graphics patch 110. If the score 107 is not greater than 111 the threshold, then the patch may be considered a patch which does not contain graphical elements 112, also considered a background patch.

In some embodiments, the threshold may be zero. In these embodiments, the score 107 may be compared to zero: if the score is above zero, then the patch contains graphical elements; otherwise, it does not contain graphics.

Figure 9:
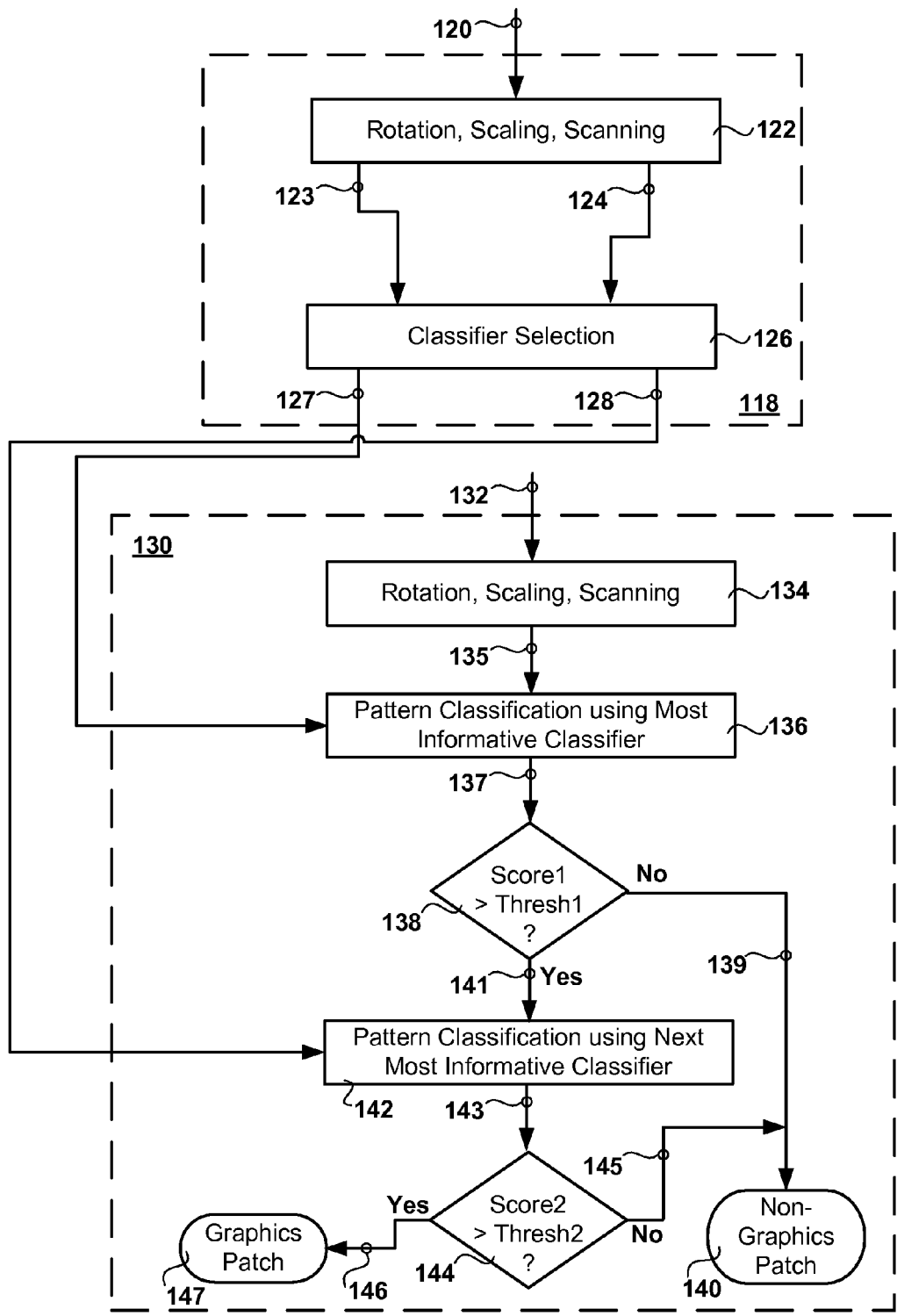
FIG. 9 is a chart showing exemplary embodiments of the present invention comprising selection of multiple classifiers.

Some embodiments of the present invention described in relation to FIG. 9 may comprise an adaptive boosting (AdaBoost) framework for classifier training 118 and classification 130 of unknown-class patches 132. These embodiments may combine multiple weak, also considered simple, classifiers into a strong, also considered complex, classifier.

The training stage 118 may require a set of training images 120, in which each patch is labeled as either a positive sample patch 123 (for example, containing a graphical element) or a negative sample patch 124 (for example, not containing a graphical element). In some embodiments of the present invention, in order to robustly detect the graphics regions with different scales and orientations, the training images 120 may be stretched to difference scales and rotated with different orientation angles 122, in addition to the original images. AdaBoost classifier selection 126 may be used to select and train a most informative classifier 127 to respond to the common image patterns shared among the positive patches 123 and to reject the image patterns in the negative patches 124. AdaBoost classifier selection 126 may be used to select and train a next-most informative classifier 128 to respond to the common image patterns shared among the positive patches 123 and to reject the image patterns in the negative patches 124.

In some embodiments of the present invention, the AdaBoost classifier selection 126 may comprise a plurality of weak classifiers which may generate a score for the given training image patch based on relatively simple operations. In some embodiments, the weak classifiers may be applied to a primitive image feature. Exemplary primitive image features may include local intensity distribution, edge responses and other primitive features.

In some embodiments of the present invention, Haar wavelet based classifiers that are based on Haar wavelet filters across multiple directions (horizontal, vertical, and diagonal) and scales may be used as weak classifiers.

In some embodiments of the present invention, informative classifiers that depend on a number of low-level features, for example, image derivatives, intensity histograms, linked edges and other low-level features may be used as weak classifiers.

In some embodiments of the present invention, Artificial Neural Network (ANN) based classifiers that may capture high-order characteristics of image primitives, for example, as text information may be used as weak classifiers.

In some embodiments of the present invention, the AdaBoost algorithm may generate a strong classifier from among a plurality of weak classifiers, which may be automatically selected and trained by the AdaBoost algorithm. In some embodiments of the present invention, the trained strong classifier may be sensitive to the graphics regions in the images. In particular, in some of these embodiments, the trained strong classifier may be sensitive to regions with long edges in multiple directions along and within substantially uniform color regions.

In some embodiments of the present invention, classification 130, also considered prediction, of unknown-class input data 132 may use the most informative trained classifier 127 and the next-most informative trained classifier 128 to predict if a given patch 132 contains graphics or not. In these embodiments, the input image patches 132 may be scaled and rotated 134. A patch 132 may be classified 136 using the most informative classifier 127 determined from the training 118. A first score 137 generated 136 by the most informative classifier 127 classification may be compared 138 to a first threshold. If the score 137 is not greater 139 than the first threshold, then the patch 132 may be considered a patch which does not contain graphical elements 140, also considered a background patch. If the score 137 is greater than 141 the first threshold, then the patch 132 may be classified 142 according to the next-most informative classifier 128 determined from the training 118. If the score 143 generated 142 by the next-most informative classifier 128 is not 145 greater than a second threshold, then the patch 132 may be considered a background patch 140. If the score 143 generated 142 by the next-most informative classifier 128 is greater 146 than the second threshold, then the patch 132 may be classified as a patch which contains a graphical element 147. In some embodiments of the present invention, both the first threshold and the second threshold may be zero.

In some embodiments of the present invention, the patches passing all the classifiers may be merged into the graphics regions, while all the other patches may be collected as the non-graphics, background area.

A detected graphics patches may contain not only one, or more, graphical elements, but also part of the non-graphics, background image areas. In some embodiments of the present invention, the non-graphics, background area may be removed from a graphics patch. Some embodiments of the present invention may segment graphical elements and non-graphics, background portions of graphical patches. Some of these embodiments of the present invention may assume that a graphics region may be divided into a number of closed regions with substantially uniform colors and that a non-graphics, background area may be usually cluttered and may not contain substantially uniform color regions. In these embodiments, the pixels with high prediction scores and substantially uniform colors, which are more likely to be part of the graphics regions, may be grouped into small regions. These initial regions may be merged based on their color similarities and spatial connectedness to form the graphics regions. The remainder of candidate patches may be moved to the non-graphics channel. In some embodiments of the present invention, a connect-component algorithm according to Chen et al. referenced above may be used.

In some embodiments of the present invention, a binary or grayscale mask image, also considered an alpha map, may be constructed based on the graphics and non-graphics channels. An alpha value, $\alpha(x, y)$, may be assigned corresponding to each pixel in the original image. In some embodiments of the present invention, a larger alpha value may mean a larger contribution from the graphics channel.

In some embodiments of the present invention, an alpha value may be limited to be either 1 or 0. In these embodiments, if a pixel's response to the graphics detector is strong and it lies within the candidate patches, then the alpha value may be 1. Conversely, the alpha value may be 0 if the pixel has a weak response to the detector or is far away from the candidate regions. The alpha value may be determined by thresholding according to:

$$\alpha(x, y) = \begin{cases} 1, & \text{if } (h(x, y) + 1)\exp(-\lambda d(x, y)) \geq \delta \\ 0, & \text{otherwise} \end{cases},$$

where $h(x, y) \in [-1, 1]$ is the response to the graphics pattern classifier, $d(x, y)$ is the pixel distance to the graphics regions, $\lambda$ is a weight factor that controls how fast the alpha value changes along the boundaries of graphics regions and $\delta$ is the threshold that controls how many pixels will be included in the graphics channel. In some embodiments of the present invention, $\delta$ may be set to a small value so that the entire graphics region may be included.

In some embodiments of the present invention, the alpha map may be refined using image morphological dilation operations, which may expand the graphics regions with a certain amount of non-graphics, background area along the boundaries. This may be necessary and important as there may be inevitable noise and artifacts in the images and failure cases of the segmentation method. The thresholding function may generate smooth alpha maps and may reduce possible artifacts or unrealistic patterns.

Figure 10:
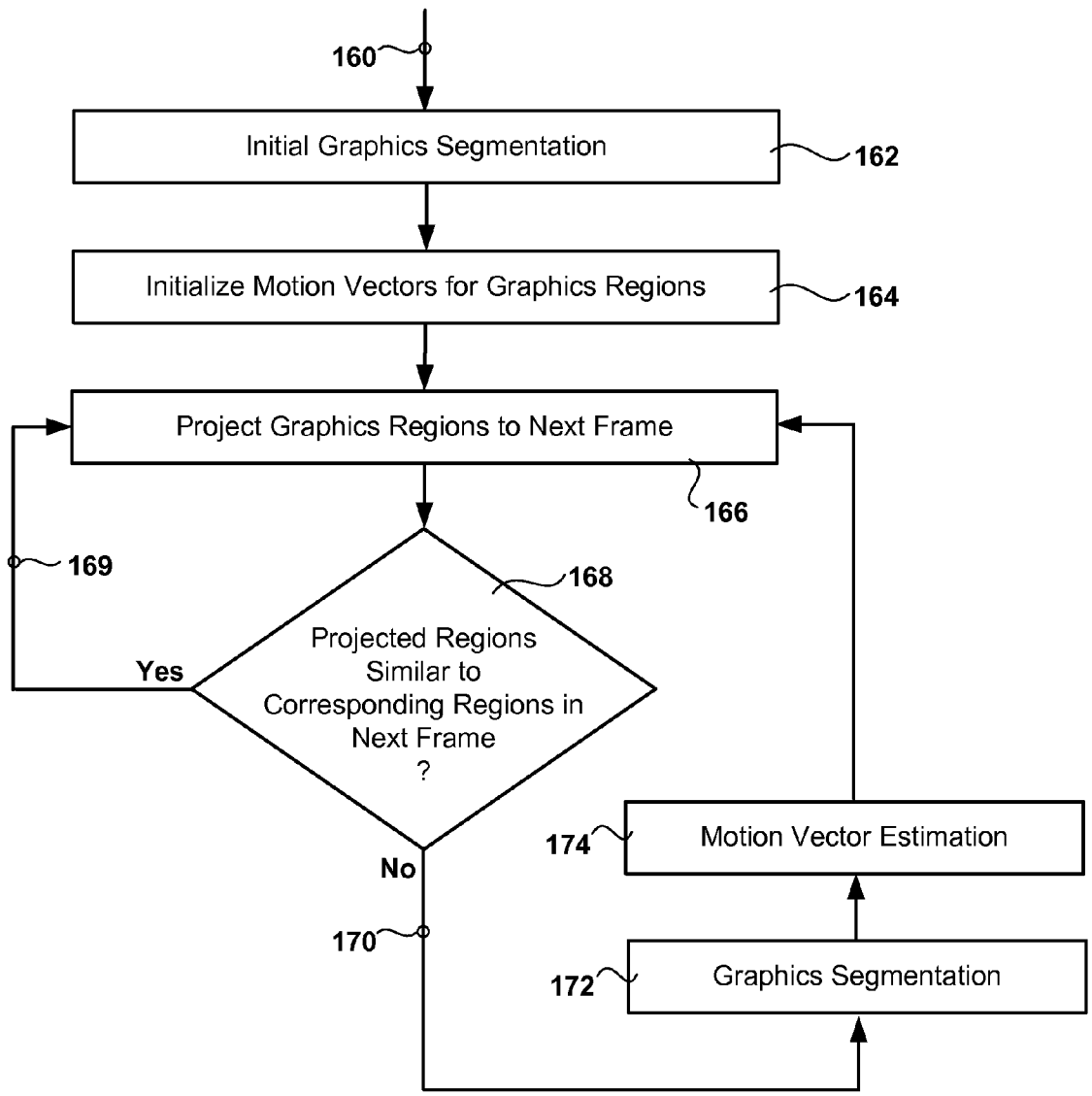
FIG. 10 is a chart showing exemplary embodiments of the present invention comprising tracking graphical regions between image frames in an video sequence.

Some embodiments of the present invention described above may be applied to still images or the individual frames of a video sequence. However, in some video content, a graphical element may remain in the sequence for at least a few seconds. Additionally, a graphical element may be shown with animation effects, for example, entering the scene from the left and exiting to the right. In some embodiments of the present invention described in relation to FIG. 10, the segmentation process may be accelerated by tracking a graphical element across multiple frames.

In some embodiments of the present invention, segmentation 162 according to embodiments of the present invention described above may be applied to a first frame in a video sequence 160 to initialize a number of graphics regions. A 2D motion vector may be assigned 164 to each graphics region. The 2D motion vector associated with a graphics region may control the movement of the region in the sequence. In some embodiments of the present invention, all of the motion vectors associated with the first frame may be initialized to zero in each dimension.

Each graphical region may be projected 166 according to its associated motion vector to form a projected graphical region associated with the next frame. A projected graphical region may be compared 168 to the corresponding area in the next frame. If the projected graphical region and the corresponding area in the next frame are sufficiently similar 169, then no segmentation step is needed for the frame, and the graphical region may be projected 166 to the next frame. If the projected graphical region and the corresponding area in the next frame are not sufficiently similar 170, then the next frame may be segmented 172 according to embodiments of the present invention. The motion vector for each graphics region may be estimated 174 by matching the graphics regions across the two frames. With the updated graphics regions and motion vectors, the next frame may be processed 166.

In some embodiments of the present invention, similarity between the projection graphical region and the corresponding area in the next frame may be measured using a distance metric, an error measure or other similarity measures known in the art.

In some embodiments of the present invention, a Kalman filter may be used to track graphical regions across multiple frames in a sequence. In these embodiments, the observed location and appearance of graphics regions may be assumed to be influenced only by additive Gaussian noise. Additionally, the motion of the graphical elements is assumed to be constantly accelerating or decelerating in these embodiments. In some embodiments of the present invention, the Kalman filter may update the location and motion of graphics regions by fast linear matrix computations.

In some embodiments of the present invention, a motion vector for each graphical region may be estimated by matching corresponding graphical regions across two frames. In some embodiments of the present invention, the motion vector may comprise a displacement vector indicating a translation, also considered a shift or a displacement, in the x-direction and a translation, also considered a shift or a displacement, in the y-direction. In alternative embodiments of the present invention, the motion vector may comprise parametric information describing the motion between frames, for example, the motion vector may comprise parameters describing an affine transform, a perspective transform or parameters associated with another transform model or combination of models.

In some embodiments of the present invention, a motion vector may be estimated by matching edge information. In alternative embodiments, luminance information may be used in motion vector estimation. In still alternative embodiments, multiple image channels may be used in motion vector estimation.

In some embodiments of the present invention described in relation to FIG. 5, the original image 40 may be segmented 41 into two channels. One channel may correspond to graphics regions 42, and the other channel may correspond to non-graphics areas 43. An alpha map 44 may be computed to modulate the two channels. The graphics channel, the non-graphics channel and the alpha map may be up-scaled 45, 46, 47 according to different up-scaling methods.

In some embodiments of the present invention, the graphics channel may be up-scaled 45 to maintain a favorable visual perception of the graphical elements. In some of these embodiments, a favorable visual perception of the graphical elements may be maintained when:

1. the local graphics regions beside an edge have substantially uniform and distinct colors, wherein greater image contrast may improve the visual perception of image sharpness;

2. the length of edges within an image are large enough, wherein a long and sharp edge may be more likely to draw viewers' attention than the segmented short edges; and 3. the width of image edges are small enough, wherein a narrow edge results in steep slopes between the adjacent regions and leads to good perception of sharpness.

Some embodiments of the present invention comprise graphics-specific up-scaling, wherein the above three characteristics may be enforced. Standard linear image interpolation methods may result in either blurry or jaggy edges. Standard non-linear interpolation methods may increase the width of the image edges, wherein narrow and sharp edges may become wider and smoother after being up-scaled, which may reduce the perceived image sharpness.

In some embodiments of the present invention, the width of an edge, or transition area, between two areas of substantially uniform color within a graphical element may be reduced, while maintaining the same contrast between the two areas. In these embodiments, the width of an edge may be shrunk, or narrowed, in the up-scaled image, while the substantially uniform areas adjacent the edge may be expanded, or dilated, towards the transition area.

Figure 11:
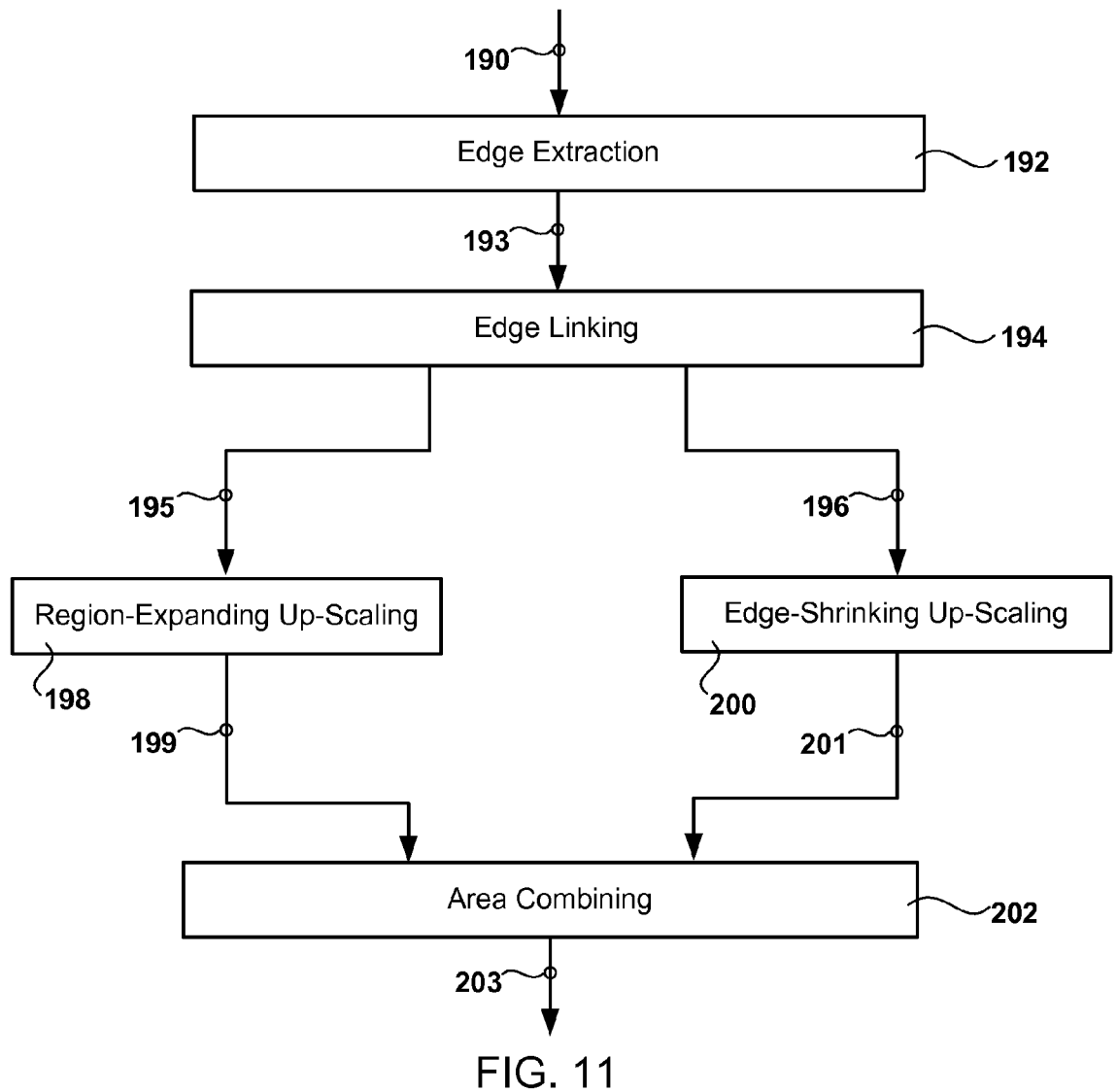
FIG. 11 is a chart showing exemplary embodiments of the present invention comprising region-expanding and edge-transition-width-shrinking up-scaling.

Some embodiments of the present invention may be described in relation to FIG. 11. Edge segments 193 may be extracted 192 from a detected graphical element 190. In some embodiments, edge segments 193 may be extracted 192 by finding the local maxima within a local window in a gradient image. Short edge segments may be linked 194 to form longer edge segments. Many methods and systems for edge extraction 192 and edge linking 194 are known in the art. Some embodiments of the present invention may comprise a Canny edge detector. Alternative embodiments may comprise alternative edge detectors. Exemplary alternative edge detectors include a Sobel edge detector, a Prewitt edge detector, a Roberts Cross edge detector, a Laplace edge detector, a Hough transform edge detector and other edge detectors known in the art. Some embodiments of the present invention may comprise multi-resolution sequential edge linking. Alternative embodiments of the present invention may comprise link detected edges based on searching near an approximate location. Yet alternative embodiments may comprise edge linking based on the Hough transform. Still alternative embodiments of the present invention may comprise edge linking based graph searching. A graphical element 190 may be divided into a number of substantially uniform sub-regions 195 and a list of edge segments which may define edge areas 196. Region-expanding up-scaling 198 may be applied to substantially uniform sub-regions 195, and edge-transition-area-shrinking up-scaling 200 may be applied to edge areas 196. The up-scaled substantially uniform regions 199 may be combined 202 with the up-scaled edge areas 201 to form the up-scaled graphics region 203.

Some embodiments of the present invention comprising region-expanding up-scaling and edge-transition-area-shrinking up-scaling may be described in relation to FIG. 12 and FIG. 13. FIG. 12 depicts a first substantially uniform region 210 separated from a second substantially uniform region 212 by an edge, also considered transition, area 211. The edge-transition-area 211 between the two substantially uniform regions 210, 212 is a spatial transition 215 between different intensity values 214, 216, which may be illustrated by a 1D cross section, also considered profile, map shown in FIG. 12 below the 2D image. The width of the transition area 215 may be measured as the number of pixels that run across the 1D profile, which may be larger than zero. A narrow edge, or steeper transition area, may be preferred to a wider edge for better image sharpness. In some embodiments of the present invention, the up-scaled image may comprise shrunken, or reduced-width, transition areas as illustrated in FIG. 13.

In FIG. 13, the top image may depict an up-scaled version of the exemplary image shown in FIG. 12. The first substantially uniform region 210 shown in FIG. 12 may correspond to a first substantially uniform region 220 in FIG. 13; the second substantially uniform region 212 in FIG. 12 may correspond to a second substantially uniform region 222 in FIG. 13; and the edge-transition region 211 in FIG. 12 may correspond to an edge-transition region 221 in FIG. 13. The 1D profile below the 2D image depicts the widened transition area 225 between the two uniform intensity values 224, 226. In some embodiments of the present invention, the widened transition area 225 may narrowed to form a new transition area 229, for example, as depicted in the 1D profile shown in FIG. 13. In some of these embodiments of the present invention, the uniform regions 228, 230 may be expanded into the transition area portions 231, 232 to fill the region from which the edge area has shrunken.

In some embodiments of the present invention, substantially uniform areas and edge areas may be up-scaled according to interpolation methods known in the art. Then the substantially uniform regions may be expanded towards the transition areas, and the edges may be shrunk at the same time. Both portions may be then combined to form the up-scaled graphics regions.

If $w^l$ and $w^h$ denote the width, in units of pixels, of corresponding edges in the original and up-scaled images, respectively, then in some embodiments of the present invention, the width of the edge, $w^h$, in the up-scaled image may be selected to satisfy $w^h < \tau w^l$, where $\tau > 1$ may be the up-conversion scale factor. In these embodiments, the width of edges in the up-scaled image may be increased by a proportion smaller than the up-conversion scale factor of the whole image.

In order to compensate for the shrunk edges, the substantially uniform regions adjacent to the edge may be expanded to cover the areas that originally belong to the edge pixels. If $\Delta_1$ and $\Delta_2$ denote the respective width of the expanded areas from both regions beside the edge, then $\tau w^l = \Delta_1 + w^h + \Delta_2$.

In some embodiments of the present invention, the expansion width from each region may be determined by a measure of the uniformity of the region. In some embodiments of the present invention, a more uniform region may have a larger width for expansion.

In some embodiments of the present invention, the pixel value for a pixel in an expansion region may be determined by extrapolation from an adjacent, substantially uniform region. The resulted edge may be narrowed with its boundaries expanded from the adjacent, substantially uniform regions.

In some embodiments of the present invention, the intensity values within a substantially uniform image region may be approximated by a quadric surface in the X-Y-I space according to:

$$I(x,y)=a_1x^2+a_2y^2+a_3xy+a_4x+a_5y+a_6,$$

where $a_i$ $i=1, \ldots, 6$ may be a set of constant coefficients for each region and each color channel.

In some embodiments of the present invention, the quadric surface corresponding to a substantially uniform region may be solved by least-squares fitting from at least six pixels within the known substantially uniform region. The intensity of the pixel outside the substantially uniform region can be determined according to the quadratic surface equation. The substantially uniform region, therefore, may be expanded toward the edge pixels with extrapolated intensity values.

Alternative embodiments of the present invention may comprise using the weighted average of the pixels extrapolated from substantially uniform regions along with the pixels interpolated from edge segments to determine intensity values in a transition region, wherein the transition region is the portion of an edge area into which a neighboring, substantially uniformly colored region may be expanded due to edge shrinking. In some of these embodiments, a pixel value in an up-scaled graphical element may be computed as a linear weighted combination of the pixels from both substantially uniform regions and edge area according to:

$$I^h(x, y) = \eta(x, y)\left[\sum_{i=1,2} w_i(x, y)I_i^h(x, y) + w_e(x, y)I_e^h(x, y)\right],$$

where $I_i^h(x, y)$ is the extrapolated pixel value in the ith uniform region, $I_e^h(x, y)$ is the interpolated pixel value from the edge area, and $\eta(x, y)$ is the normalizing factor:

$$\eta(x, y) = \frac{1}{w_1(x, y) + w_2(x, y) + w_e(x, y)},$$

where $w_1(x, y)$, $w_2(x, y)$ and $w_e(x, y)$ are the pixel-variant weight functions that balance the contributions of pixel colors from the edge area and from substantially uniform regions.

In some embodiments, the weight function for the extrapolated pixels, $w_i(x, y)$, may be defined to replace the interpolated edge pixels with the pixels extrapolated from the ith uniform regions. In some embodiments, this weight may increase when a pixel is closer to the boundary of the edge area, so that the pixels from substantially uniform regions replace the original edge pixels. In some embodiments, the weight may be larger in accordance to a larger difference between the interpolated and extrapolated image intensities, thereby boosting the steepness of the image edge in the color space. In these embodiments, the weights may be determined according to:

$$w_i(x,y)=\exp(-d(x,y)+\lambda_i|I_i^h(x,y)-I_e^h(x,y)|),$$

where $d(x, y)$ is the distance from the pixel to the edge center and $\lambda_i$ is a number which may balance the influence of pixel distances and color differences. In some embodiments of the present invention, $\lambda_i$ may be adjusted according to the response of the corresponding uniform region to a high-pass filter. A region with smaller responses to the high-pass filter may be assigned a larger $\lambda$ value than a region with larger responses to the high-pass filter. In contrast, regions with more texture may be assigned a smaller $\lambda$ value for the expansion.

In some embodiments, the weight function $w_i(x, y)$ may take into account both geometric closeness and photometric closeness, and it may boost the image edges by penalizing the pixels with values similar to the interpolated edge pixels.

In some embodiments of the present invention, the weight for the interpolated edge pixels, $w_e(x, y)$, may be defined to set the pixel colors for the inner portion of the edge segment. The weight may reach its maximum at the center of the edge area and may decay quickly towards to the boundary of the edge area. In some embodiments, the weight function may be determined according to:

$$w_e(x,y)=\exp[-d(x,y)],$$

where $d(x, y)$ is the distance from the pixel to the edge center.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for up-scaling an image, said method comprising:
    segmenting a first image into a first non-graphical region;
    segmenting said first image into a first graphical region;
    up-scaling said first non-graphical region according to a first up-scaling method; and
    up-scaling said first graphical region according to a second up-scaling method,
    wherein said second up-scaling method comprises:
        determining a first edge area within said first graphical region, wherein said first edge area separates a first substantially uniform region in said first graphical region from a second substantially uniform region in said first graphical region;

determining a second edge area within a second graphical region, wherein said second graphical region is related to said first graphical region by a scaling factor greater than one and said second edge area corresponds to said first edge area;

assigning a first value to a first pixel in a first portion of said second edge area, wherein said first value is based on a first plurality of pixel values in said first edge area; and assigning a second value to a second pixel in a second portion of said second edge area, wherein said second value is based on a second plurality of pixel values in said first substantially uniform region.

2. A method as described in claim 1 further comprising assigning a third value to a third pixel in a third portion of said second edge area, wherein said third value is based on a third plurality of pixel values in said second substantially uniform region.

3. A method as described in claim 1, wherein said determining a first edge area comprises:
edge detection; and
edge linking.

4. A method as described in claim 3, wherein:
said edge detection comprises a Canny edge detector; and
said edge linking comprises a multi-resolution sequential edge linking method.

5. A method as described in claim 1, wherein said assigning a second value to a second pixel in a second portion of said second edge area comprises:
determining a first quadratic surface representative of said second plurality of pixel values in said first substantially uniform region; and
determining said second value based on said first quadratic surface representation and the location of said second pixel.

6. A method as described in claim 1, wherein said assigning a second value to a second pixel in a second portion of said second edge area comprises:
determining a first extrapolated pixel value based on said second plurality of pixel values in said first substantially uniform region;
determining an interpolated pixel value based on said first plurality of pixel values in said first edge area; and
combining said first extrapolated pixel value and said interpolated pixel value to generate said second value.

7. A method as described in claim 6, wherein said combining comprises a linear weighted combination of said interpolated pixel value and said first extrapolated pixel value.

8. A method as described in claim 7, wherein said linear weighted combination is a normalized, linear weighted combination.

9. A method as described in claim 7 further comprising an edge weight, wherein said edge weight is based on a distance from a center of said second edge area and the location of said second pixel.

10. A method as described in claim 7 further comprising a first extrapolation weight, wherein said first extrapolation weight is based on:
a distance from a center of said second edge area and the location of said second pixel; and
a difference between said interpolated pixel value and said first extrapolated pixel value.

11. A method as described in claim 6 further comprising:
determining a second extrapolated pixel value based on said third plurality of pixel values in said second substantially uniform region; and
combining said first extrapolated pixel value, said second extrapolated pixel value and said interpolated pixel value to generate said second value.

12. A method as described by claim 11, wherein said combining said first extrapolated pixel value, said second extrapolated pixel value and said interpolated pixel value to generate said second value comprises a linear weighted combination of said interpolated pixel value, said first extrapolated pixel value and said second extrapolated pixel value.

13. A method as described by claim 12, wherein said linear weighted combination is a normalized, linear weighted combination.

14. A method as described in claim 11 further comprising an edge weight, wherein said edge weight is based on a distance from a center of said second edge area and the location of said second pixel.

15. A method as described in claim 11 further comprising:
a first extrapolation weight, wherein said first extrapolation weight is based on:
a distance from a center of said second edge area and the location of said second pixel; and
a difference between said interpolated pixel value and said first extrapolated pixel value; and
a second extrapolation weight, wherein said second extrapolation weight is based on:
said distance from a center of said second edge area and the location of said second pixel; and
a difference between said interpolated pixel value and said second extrapolated pixel value.

16. A method for up-scaling a graphical image element, said method comprising:
determining a first edge area within a first graphical image element, wherein said first edge area separates a first substantially uniform region in said first graphical image element from a second substantially uniform region in said first graphical image element;
determining a second edge area within a second graphical image element, wherein said second graphical image element is related to said first graphical image element by a scaling factor greater than one and said second edge area corresponds to said first edge area;
assigning a first value to a first pixel in a first portion of said second edge area based on a first plurality of pixel values in said first edge area; and
assigning a second value to a second pixel in a second portion of said second edge area based on a second plurality of pixel values in said first substantially uniform region.

17. A method as described in claim 16 further comprising assigning a third value to a third pixel in a third portion of said second edge area based on a third plurality of pixel values in said second substantially uniform region.

18. A method as described in claim 16, wherein said determining a first edge area comprises:
edge detection; and
edge linking.

19. A method as described in claim 18, wherein:
said edge detection comprises a Canny edge detector; and
said edge linking comprises a multi-resolution sequential edge linking method.

20. A method as described in claim 16, wherein said assigning a second value to a second pixel in a second portion of said second edge area comprises:
determining a first extrapolated pixel value based on said second plurality of pixel values in said first substantially uniform region;

determining a second extrapolated pixel value based on said third plurality of pixel values in said second substantially uniform region;

determining an interpolated pixel value based on said first plurality of pixel values in said first edge area; and combining said first extrapolated pixel value, said second extrapolated value and said interpolated pixel value to generate said second value.

21. A method as described in claim 20, wherein said combining said first extrapolated pixel value, said second extrapolated pixel value and said interpolated pixel value to generate said second value comprises a linear weighted combination of said interpolated pixel value, said first extrapolated pixel value and said second extrapolated pixel value.

22. A method as described in claim 21 further comprising an edge weight, wherein said edge weight is based on a distance from a center of said second edge area and the location of said second pixel.

23. A method as described in claim 21 further comprising:
a first extrapolation weight, wherein said first extrapolation weight is based on:
  a distance from a center of said second edge area and the location of said second pixel; and
  a difference between said interpolated pixel value and said first extrapolated pixel value; and
a second extrapolation weight, wherein said second extrapolation weight is based on:
  said distance from a center of said second edge area and the location of said second pixel; and
  a difference between said interpolated pixel value and said second extrapolated pixel value.

24. A method as described in claim 21, wherein said linear weighted combination is a normalized, linear weighted combination.

25. A method for up-scaling a graphical image element, said method comprising:
determining a first edge area within a first graphical image element, wherein said first edge area separates a first substantially uniform region in said first graphical image element from a second substantially uniform region in said first graphical image element;

up-scaling said first edge area according to a first scale factor; and up-scaling said first substantially uniform region according to a second scale factor, wherein said first scale factor is less than said second scale factor.

* * * * *